United States Patent [19]

Blachman

[11] Patent Number: 4,472,784

[45] Date of Patent: Sep. 18, 1984

[54] ENSURING SAMPLE INDEPENDENCE IN RANDOM SAMPLING SYSTEMS

[75] Inventor: Nancy R. Blachman, Holmdel, N.J.

[73] Assignee: AT&T Bell Laboratories, Murray Hill, N.J.

[21] Appl. No.: 329,727

[22] Filed: Dec. 11, 1981

[51] Int. Cl.$^3$ .............................................. G06F 1/02
[52] U.S. Cl. ..................................... 364/554; 364/717
[58] Field of Search ............... 364/554, 550, 717, 569

[56] References Cited

U.S. PATENT DOCUMENTS

| 3,746,847 | 7/1973 | Maritsas | 364/717 |
|---|---|---|---|
| 3,758,757 | 9/1973 | Buhler et al. | 364/179 |
| 3,761,696 | 9/1973 | Russell | 364/717 |
| 4,136,596 | 1/1979 | Hansford | 364/554 |
| 4,218,749 | 8/1980 | Babaud et al. | 364/717 |
| 4,219,877 | 8/1980 | Vladimirov et al. | 364/554 |
| 4,320,400 | 3/1982 | Chasek | 364/550 X |

FOREIGN PATENT DOCUMENTS

| 588550 | 1/1978 | U.S.S.R. | 364/554 |

OTHER PUBLICATIONS

"A New Methodology for Computer System Data Gathering", R. A. Orchard, Computer Science and Technology: Computer Performance Evaluation User Group (CPEUG), Sep. 1977, pp. 159–167.

Hybrid Simulation of Measurement Procedures, J. Sztipanovits, Conference Proceedings of the 8th AICA Congress, Aug. 1976, pp. 243–249.

Primary Examiner—Edward J. Wise
Attorney, Agent, or Firm—Roy C. Lipton

[57] ABSTRACT

A technique for ensuring independence of random samples of input queues of time-shared processing systems taken during a fixed interval to determine system usage involves interposing guardband intervals of minimum time duration between such samples. A stratified sampling method is disclosed which develops successive stratum or subintervals, positions a data sampling at a random point in each subinterval and interposes a guardband interval between successive subintervals. A simple random sampling method is disclosed which takes a sampling at the termination of a random subinterval and interposes a guardband interval between successive random subintervals.

7 Claims, 6 Drawing Figures

FIG. 1
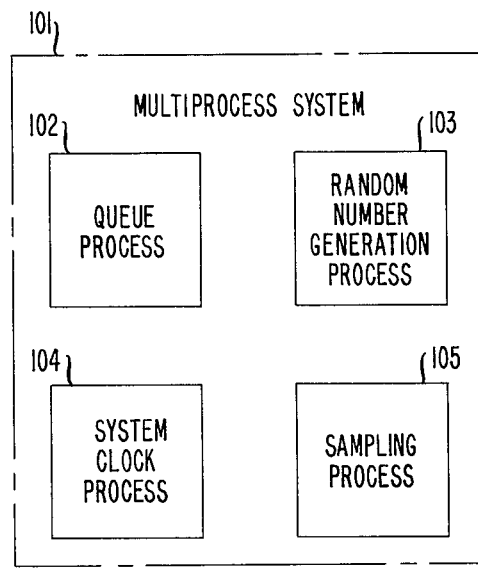
FIG. 2 STRATIFIED SAMPLING WITH GUARDBAND METHOD
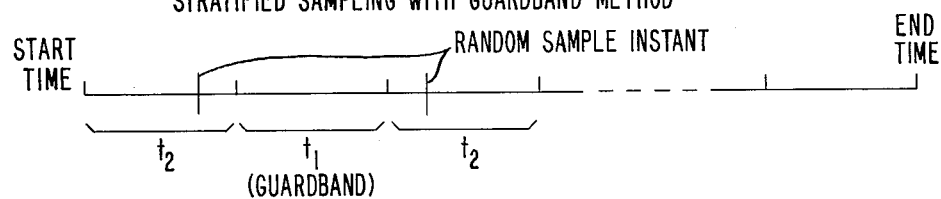
FIG. 3 RANDOM SAMPLING WITH GUARDBAND METHOD
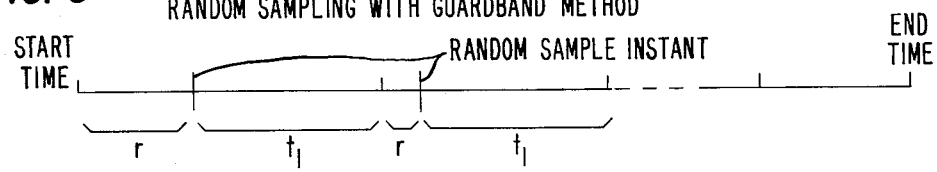
FIG. 6
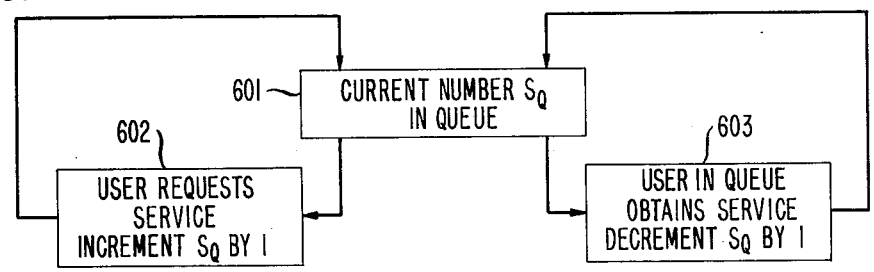

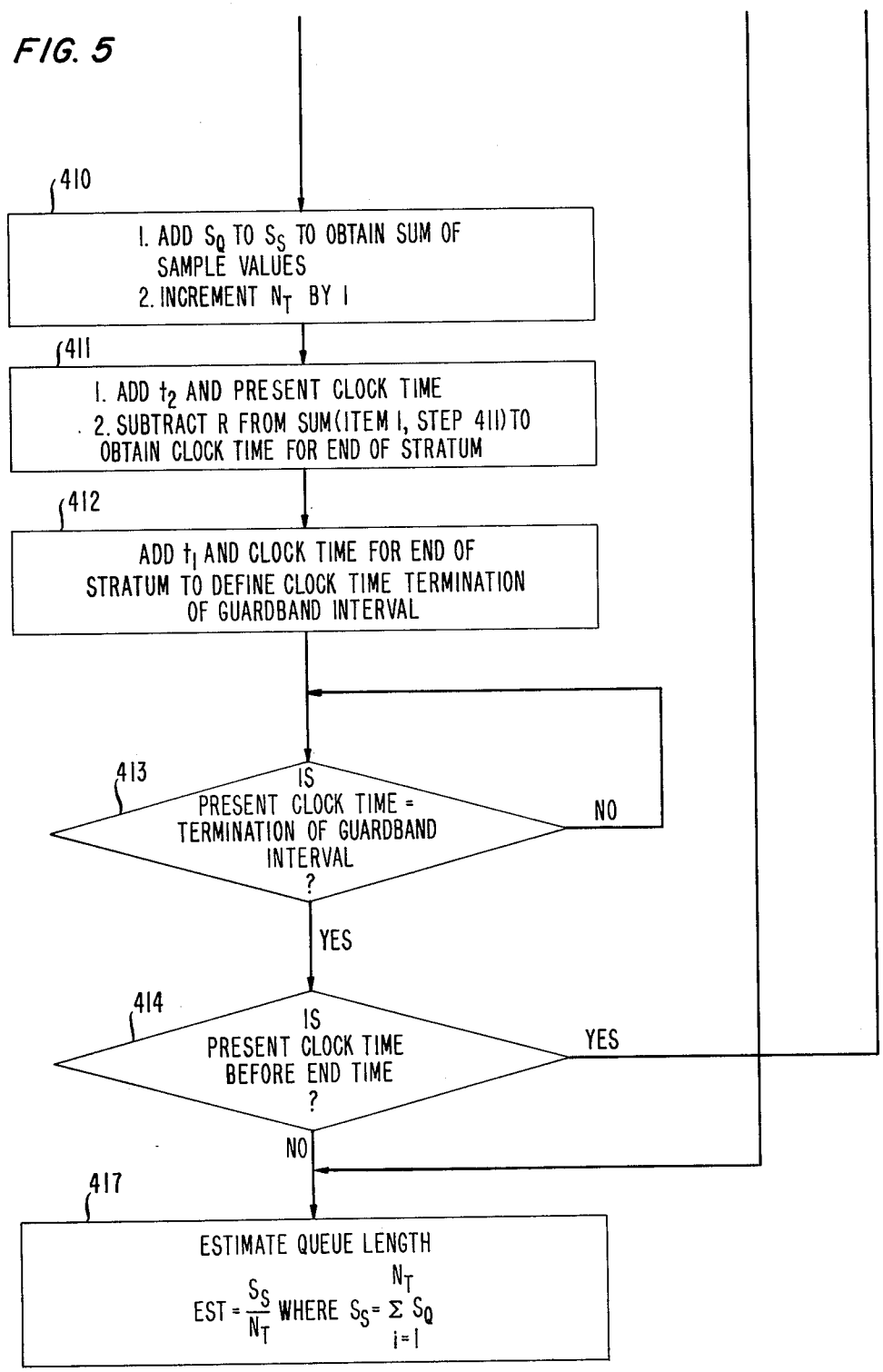

ENSURING SAMPLE INDEPENDENCE IN RANDOM SAMPLING SYSTEMS

Field of the Invention

This invention relates to random sampling methods and, more particularly, to random sampling methods useful for data gathering to analyze computer systems and the like.

Background of the Invention

Monitoring of data in a computer system or network has many purposes, such as for analyzing system usage and performance. It might be useful, for example, in a time-shared processing system to determine the average number of users awaiting service in system queues. A typical data gathering technique to make this determination involves periodically sampling the queue to thereby obtain the number of users therein awaiting service during some predetermined analysis period.

It is known that fixed periodic sampling may yield statistically biased results if the changes in the sampled data cannot be characterized mathematically as random. If the sampling rate is increased or raised, the confidence level associated with the estimated result is correspondingly raised. The increased rate, however, may not necessarily correct the statistically biased results. Accordingly, accuracy in the results might only be achieved by sampling which is entirely random.

There are a number of different possible approaches to random sampling. Advantageously, for each of several approaches, a discrete analysis period is defined and the average number of samples to be obtained during this discrete period is determined in accordance with the confidence level desired. The average interval between samples can thus be calculated. For simple random sampling, one obtains random numbers which lie between zero and twice the length of the average interval. The random numbers, thus obtained, identify successive random time intervals (or subintervals of the discrete analysis period) and the random pulse occurs at the termination of each such subinterval. Another approach, defined stratified sampling, creates analysis period subintervals or stratum and positions a sampling in a random point in each stratum.

These several random sampling approaches could achieve freedom from statistical bias and high level of confidence. The approaches permit, however, situations where there may be substantially little or no time gap between two successive samples. This could result in the lack of independence of information in the successive samplings since, if the samplings are taken too closely together, the information in the samplings have an inordinate high degree of redundancy; more samples are taken than necessary.

Summary of the Invention

It is an object of this invention to provide an improved random sampling process. It is a more specific object of this invention to achieve independence between random samples.

In accordance with the objects of this invention, a fixed duration of time is defined to identify guardband intervals and the initiation of subintervals of the discrete analysis period is delayed for the fixed duration of time after termination of the prior subinterval whereby guardband intervals are interposed between subintervals to insure appropriate time separation of successive samples.

One specific embodiment, described in detail hereinafter, involves the stratified sampling method arranged in accordance with this invention. More specifically, during an analysis period, subintervals or stratum are created and a sampling is positioned in a random point in each stratum to formulate the stratified sampling method. The initiating of each stratum is delayed for the fixed duration of time to interpose guardband intervals. Each sampling obtains data which is accumulated during the analysis period and is processed at the termination of the period.

Another specific embodiment, described hereinafter, involves the simple random sampling method arranged in accordance with this invention.

The foregoing and other objects and features of this invention will be more fully understood from the following description of an illustrative embodiment thereof taken in conjunction with the accompanying drawings.

Brief Description of the Drawing

In the drawings:

FIG. 1 is a symbolic representation of processes of a time-shared processing system arranged in accordance with this invention;

FIG. 2 depicts a timing diagram illustrating an example of a stratified sampling method in accordance with this invention;

FIG. 3 depicts a timing diagram illustrating an example of a simple random sampling method in accordance with this invention;

FIGS. 4 and 5, when vertically aligned, show a flow diagram disclosing the steps involved in implementing a sampling process in accordance with this invention; and FIG. 6 discloses a flow diagram disclosing the details of a conventional queueing process.

Detailed Description

Figure 4:
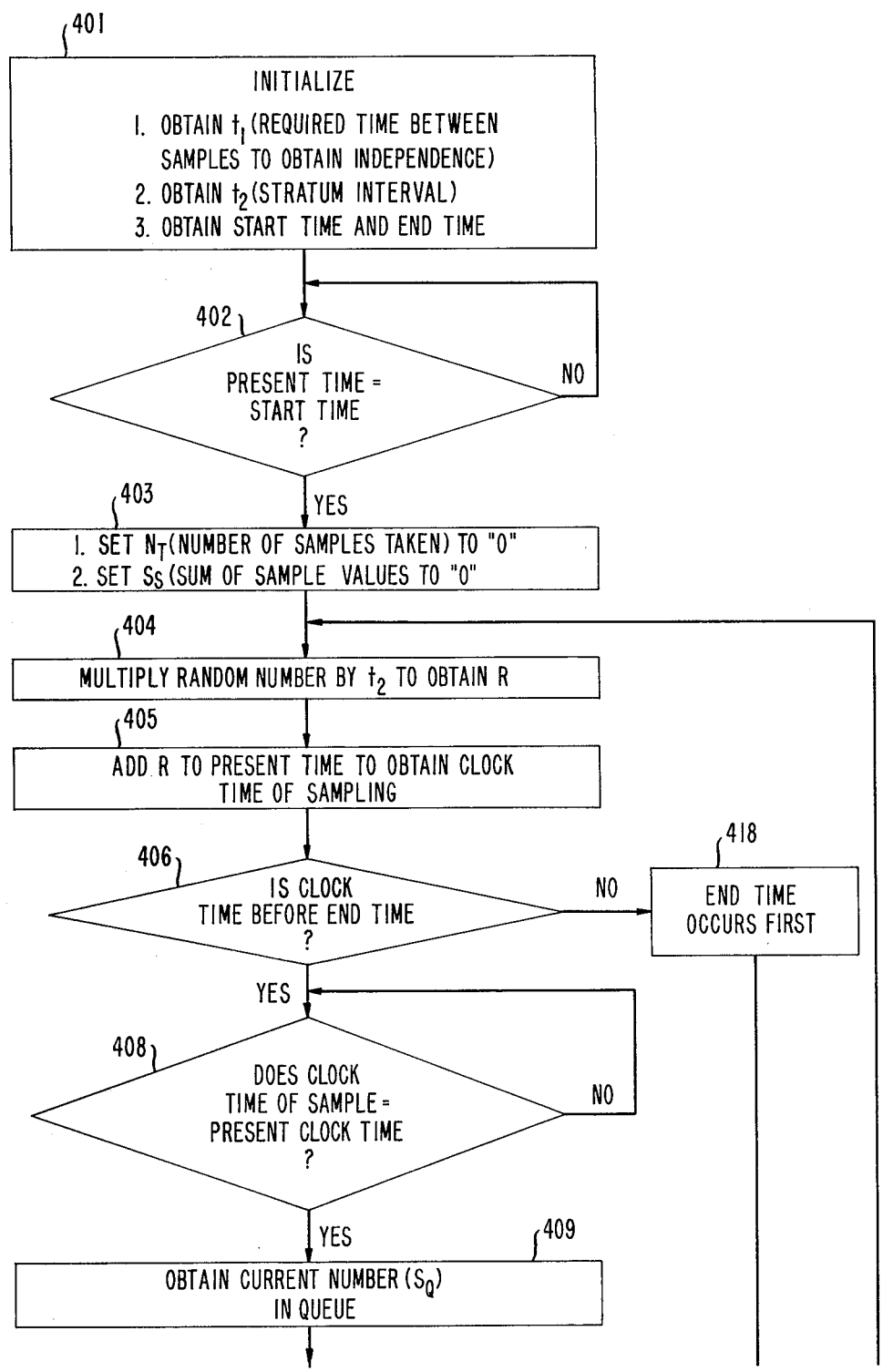

Multiprocess system 101 depicted in FIG. 1 symbolically represents the resources of a conventional time-shared computing or processing machine or system. In general, a process is capable of performing all or part of a job or task, typically using hardware apparatus operating in accordance with software instructions.

For the purpose of describing this invention, four of the many processes of multiprocess system 101 are shown in FIG. 1. These processes constitute queueing process 102, random number generation process 103, system clock process 104 and sampling process 105.

Queueing process 102 provides the functions of accepting requests from the various time-share users of the system, queueing or lining up the requests of various users in accordance with a predetermined criteria, such as a first-in, first-served basis, and then serving the request by providing the user access to the appropriate system resources when the queue process determines that the user's time to be served has arrived. As described in further detail hereinafter, queue process 102 also maintains a count of the number of users in the queue who are waiting to have their requests met but have not as yet been served.

Random generation process 103 constitutes a conventional process for generating random numbers between "0" and "1". These random numbers will be used by sampling process 105 as described in detail hereinafter.

System clock process 104 constitutes a process for generating identification of the time of day. This time of day identification is available to sampling process 105 for the purpose of utilizing various times of day and various time intervals.

Sampling process 105 provides a process, in accordance with this invention, for periodically sampling the number count of the users in the queue awaiting service. In accordance with a specific embodiment of this invention, these samples are taken over a predefined interval of time and the sampled data is then utilized to estimate the average queue length, that is, to estimate the average number of users awaiting service.

A number of different methods of sampling may be advantageously utilized in accordance with this invention. One method of sampling is identified as stratified sampling, which sampling process is described in an article of R. A. Orchard entitled "A New Methodology for Computer System Data Gathering", *Computer Science and Technology: Computer Performance Evaluation Users Group* (*CPEUG*), Proceedings of the Thirteenth Meeting held at New Orleans, Louisiana, Oct. 11–14, 1977, pp. 159–167. In accordance with the stratified sampling method discussed by R. A. Orchard, successive stratum (or subintervals) each having a duration of time ($t_2$) is defined. Sampling is then provided at one random instant of time in each of the stratum (or subintervals).

It can be deduced that a minimum time is required between samples to achieve independence, which independence may be defined as the independence of information in successive samples. If samples are taken too closely together, more information is obtained than is necessary and such information therefore has a degree of redundancy.

In accordance with this invention and as shown in FIG. 2, a stratified sampling process having a minimum interval between samples is achieved. More specifically in accordance with a specific implementation described in detail hereinafter and as shown in the timing diagram depicted in FIG. 2, a stratum having a time interval $t_2$ is first generated and a random sample is developed within the stratum. At the termination of the stratum interval, the sampling process terminates and pauses for a "guardband" interval having a duration ($t_1$) of time. At the termination of this guardband interval, stratified sampling is resumed by again reproducing a stratum interval and again generating a random sample during this interval. This, as seen in FIG. 2, has the effect of producing interleaved stratum and guardband intervals with random sampling in each of the stratum, which samplings are independent from each other. As further noted in FIG. 2, this sampling is initiated at a predetermined Start of clock time and is terminated, that is, no sampling occurs, after a predetermined End of clock time.

An alternative method of sampling designated random sampling is also described hereinafter in accordance with this invention. Random sampling, as is well known in the art, constitutes generating a series of random samples or samplings in a specified interval. One might conceive of random sampling as producing a series of random subintervals in such specified interval, which subintervals might be random in duration and then taking the sampling at the end of each such random subinterval. Independence of the samples in the random sampling method is achieved in accordance with this invention by interposing guardband intervals. As seen in the timing diagram depicted in FIG. 3, random samples are taken in the specified interval (Start Time, End Time). At the termination of the subinterval of random length r, the first random sampling occurs. A guardband interval $t_1$ is initiated at this point of time to provide a minimum time interval between samples to achieve dependence. At the termination of the guardband interval $t_1$, sampling is recommenced if the End of clock time has not been reached. A new subinterval of random length r is generated. At the end of it a sample of the queue length is taken. Guardband intervals are thus interleaved with random subintervals in substantially the same way that guardbands are interleaved with stratum in the stratified sampling process.

To develop the stratified sampling method, the duration of the sampling must be defined. More specifically, the clock time for the start of the process and the clock time for the termination of the sampling process is stored in the time-shared processing system or machine and rendered available to sampling process 105 as the Start clock time and End clock time.

The stratified sampling method also requires the determination of the guardband time interval ($t_1$). This time interval constitutes a time constant which is the same for each guardband interval. In order to achieve independence between samples, the time separation must be equal to or in excess of a minimum time interval. It has been determined that such a minimum time interval $t_1$ may be calculated from the following equation:

$$t_1 = \frac{\log d}{[-(\lambda + \mu) + 2\sqrt{\lambda \cdot \mu}\ ]} \qquad (1)$$

wherein the mean arrival rate $\lambda$ constitutes the mean arrival rate of requests for service that are received by queue process 102; the mean service time ($1/\mu$) constitutes the time required for the computer to service each of successive requests and d is an estimation of the correlation of information between successive samples (which lies between 0 and 1) in the absence of guardband intervals where lower numbers signify lower degrees of correlation. The constant $t_1$ thus being calculated is stored in the computer or processing machine for use in the stratified sampling method described below.

The stratified sampling method also requires identification of the length ($t_2$) of each stratum wherein $$t_2 = \frac{T}{N} - t_1 \qquad (2)$$

wherein T is clock time duration from start to end of the processing, that is, the interval wherein the plurality of samples are taken between the Start time clock time and End clock time and the average number of samples to be taken is defined by $$N = [k/b]^2 \qquad (3)$$

As taught by the above-identified article by R. A. Orchard, k is correlated with a confidence level desired for the sampling and b is the number of standard deviations from the actual mean queue length within which the estimated mean queue length must lie, i.e., $$\bar{x} - b\sigma \leq \bar{x} \leq \hat{x} + b\sigma. \qquad (4)$$

where $\bar{x}$=actual mean queue length, $\hat{x}$=estimated mean queue length, and $\sigma$=standard deviation of the queue length during the specified interval.

As seen in process step 401 in FIG. 4, the process 105 is initialized by obtaining the above-described stored values of constants $t_1$ and $t_2$ and the Start and End clock times which were also stored as described above. The process proceeds to the next step or routine (402) wherein the present clock time is obtained from system clock process 104 and compared with the Start clock time. When there is an equality between the present and Start clock times, the stratum interval commences and the process advances to step or routine 403.

In routine 403, a sum of sample values ($S_S$) is set to "0". The variable $S_S$ will designate the accumulated number of users in the queue waiting to be served when the plurality of samples are taken. A number of samples ($N_T$) is set to "0" to maintain a count of the number of samples taken. The process then advances to step 404.

In step 404, the constant $t_2$ is multiplied with the random number obtained from random number generation process 103. The product thus obtained provides the random instant (R) in the present stratum that sampling takes place. This random instant (R) is added to the present clock time, in routine 405, to define the exact clock time for the stratified sample to take place.

The process now advances to decision step 406 wherein the exact sample clock time calculated in step 405 is compared with the End clock time to determine whether the stratified sample would occur after the End time for the entire sampling process. If the sampling would occur after the End clock time, routine 418 advances the process to step 417 to be described below. It is assumed in this case, however, that this first sample instant is before the End clock time and, upon such determination by routine 406, the process advances to decision step or routine 408.

In step 408 the clock time for the first sampling instant is compared with the present clock time and, when they coincide, the process steps to routine 409 to obtain the number output ($S_Q$) of the queue. This number output, as noted above, defines the number of users in the queue awaiting service. In step 410 (FIG. 5), number $S_Q$ is then added to the sum of sample numbers $S_S$ to obtain a new sum number. The number of samples taken ($N_T$) is incremented by "1". The process thereupon advances to step 411.

In step 411, the present clock time (i.e., the time of the present sampling) is added with $t_2$ and the sampling time R is subtracted from this sum to obtain the clock time that defines the termination of the stratum time which coincides with the initiation of the guardband interval. Production of stratum intervals for sampling new ceases for the duration of the guardband interval.

The clock time for the initiation of the guardband interval is added to time $t_1$ in routine 412 to identify the clock time terminating the guardband interval. Sampling now pauses or stops and the guardband time interval occurs while decision routine 413 compares the present clock time and the clock time termination of the guardband interval, delaying the advancing of the process until the guardband interval terminates.

When the guardband interval terminates, routine 413 advances the process to decision step 414 wherein this termination of guardband clock time is compared with the End clock time of the sampling. If the termination of guardband clock time occurs after the End clock time, step 414 advances the process to routine 417 described hereinafter. In the event, however, that the termination of guardband clock time occurs first, the process returns to step 404. In step 404, a new random number is obtained and the new random number is again multiplied with the stratum time $t_2$ to obtain a new sampling instant R which is added, in routine 405, to the present clock time to define the new sampling clock time instant. The next sampling is thus determined in substantially the same manner as the fist sampling described above.

Assume now that the sampling clock time or the termination of guardband clock time occurs after the End clock time, previously described with respect to routines 414 and 418. This advances the process to step 417. In step 417, the process provides an estimate of the average queue length during the time interval from the Start to the End of the sampling. More specifically, the average queue length is determined from the sum of the sample numbers $S_S$ divided by the number ($N_T$) of samples taken. This estimated result, upon calculation, is therefore available to provide an estimated average queue length derived from stratified sampling taken with intervening guardbands to provide an appropriate time interval between samples to achieve independence.

To develop the random sampling method the duration of the sampling interval must be defined in the same way as the stratified sampling method is developed from the Start clock time and the End clock time. The guardband time interval ($t_1$) constant is calculated in the same manner as the stratified sampling method and the upper bound ($t_2$) on random number R is then obtained from the equality:

$$t_2 = 2\left(\frac{T}{N} - t_1\right). \tag{5}$$

The process steps for random sampling is then substantially identical with the process steps for the stratified sampling method described above relative to FIGS. 4 and 5, with the exception that step or routine 411 is eliminated. The guardband interval commences immediately after a sample is taken. In all other respects including the determination of the average queue length, the routines for the random sampling method are substantially identical to the routines for the stratified sampling method.

FIG. 6 discloses an appropriate process for generating the current number of users ($S_Q$) in the queue awaiting service. As seen in FIG. 6 and more specifically in routine 602 when a user requests service, the current number $S_Q$ is obtained and incremented and this new current number constitutes the number of users in the queue awaiting service. In the event that a user in the queue obtains service, the current number is decremented as seen in routine 603 and this new $S_Q$ number constitutes the current number in the queue awaiting service.

Although a specific embodiment of this invention has been shown and described, it will be understood that various modifications may be made without departing from the spirit of this invention.

What is claimed is:

1. A method of providing a plurality of random samplings of data within a predetermined time interval wherein each sampling is accommodated by an individual one of a plurality of successive subintervals, comprising the steps of:

obtaining a value defining a fixed duration of time for identifying durations of guardband intervals, obtaining clock times identifying each of the plurality of subintervals to accommodate the sampling individual thereto by identifying the initiation clock time and termination clock time of the subinterval, delaying the initiation time of each subinterval after termination of the prior subinterval in the succession for the defined fixed duration of time whereby guardband intervals are interposed between successive ones of the subintervals, and sampling the data in the accommodating subinterval by obtaining the data sampling at a clock time between the initiation clock time and the termination clock time thereof.

2. A method of providing a plurality of random samplings in accordance with claim 1 wherein the step of sampling the data includes obtaining a data sampling at a random point within the subinterval.

3. A method of providing a plurality of random samplings in accordance with claim 2 wherein the step of sampling the data is precluded when the occurrence thereof is after the termination of the predetermined time interval.

4. A method of providing a plurality of random samplings in accordance with claim 3 and further including the steps of:

acquiring data in response to each sampling, and accumulating the acquired data.

5. A method of providing plurality of random samplings in accordance with claim 2 wherein the step of obtaining clock times identifying each subinterval is precluded when the termination of the guardband interval occurs after the termination of the predetermined time interval.

6. A method providing a plurality of random samplings in accordance with claim 5 and further including the steps of:

acquiring data in response to each sampling, and accumulating the acquired data.

7. A method of providing a plurality of random samplings in accordance with claim 1 wherein the step of sampling the data includes obtaining a data sampling at the termination of the subinterval.

* * * * *